United States Patent [19]

Mollere et al.

[11] Patent Number: 4,915,705
[45] Date of Patent: Apr. 10, 1990

[54] PRODUCTION OF SILICA AND FLUORINE-CONTAINING COPRODUCTS FROM FLUOSILICIC ACID

[75] Inventors: Phillip D. Mollere; Tadeusz K. Wiewiorowski; Vivian C. Astley, all of New Orleans; Willis L. Thornsberry, Jr., Gretna; Michael A. Murray, Harvey, all of La.

[73] Assignee: Freeport Research and Engineering Co., New Orleans, La.

[21] Appl. No.: 224,223

[22] Filed: Jul. 22, 1988

Related U.S. Application Data

[63] Continuation of Ser. No. 891,889, Aug. 1, 1986, abandoned.

[51] Int. Cl.⁴ .............................................. C01D 3/24
[52] U.S. Cl. .................... 23/362 R; 423/339; 423/357; 423/470; 423/471; 423/490; 423/499
[58] Field of Search ............... 423/339, 357, 470, 471, 423/490, 499

[56] References Cited

U.S. PATENT DOCUMENTS

| | | | |
|---|---|---|---|
| 2,780,522 | 2/1957 | Gloss et al. | 423/470 |
| 3,021,194 | 2/1962 | Cunningham | 423/470 |
| 3,024,086 | 3/1962 | Cines | 423/470 |
| 3,111,384 | 11/1963 | Heckathorn et al. | 423/470 |
| 3,271,107 | 9/1966 | Nickerson et al. | 423/470 |
| 3,549,317 | 12/1970 | Dorn et al. | 423/470 |
| 4,026,997 | 5/1977 | Schneider et al. | 423/470 |
| 4,057,614 | 11/1977 | Ono et al. | 423/470 |
| 4,062,929 | 12/1977 | Thompson et al. | 423/470 |
| 4,264,563 | 4/1981 | Sikdar | 423/331 |
| 4,308,244 | 12/1981 | Sikdar et al. | 423/339 |
| 4,613,494 | 9/1986 | Barber | 423/470 |
| 4,623,521 | 11/1986 | Gravley et al. | 423/450 |

FOREIGN PATENT DOCUMENTS 58-46355 10/1983 Japan .................................. 423/490

*Primary Examiner*—Robert L. Stoll
*Assistant Examiner*—Robert M. Kunemund
*Attorney, Agent, or Firm*—Fisher, Christen & Sabol

[57] ABSTRACT

A process for producing high grade silica and fluorine-containing coproducts from fluosilicic acid is described. To produce silica, the fluosilicic acid is reacted with aqueous ammonia to produce a solid silica product and a solution of ammonium fluoride. The solid silica is washed under controlled conditions and further processed to produce a high grade product. The ammonium fluoride solution is concentrated and sold as a concentrated ammonium fluoride solution product or reacted with metal hydoxides or oxides to produce metal fluorides.

26 Claims, 1 Drawing Sheet

PRODUCTION OF SILICA AND FLUORINE-CONTAINING COPRODUCTS FROM FLUOSILICIC ACID

This application is a continuation, of application Ser. No. 891,889, filed Aug. 1, 1986, now abandoned.

BACKGROUND OF THE INVENTION

1. Field of the Invention.

This invention relates to a method for producing high-quality silica and fluorine-containing coproducts.

2. Description of the Prior Art

Phosphate rock normally contains appreciable quantities of fluorine compounds and of silicon compounds. When such phosphate rock is used to produce wet process phosphoric acid, much of the fluorine and silicon content of the phosphate rock is converted to fluosilicic acid, $H_2SiF_6$. The quantity of fluosilicic acid generated at individual wet process phosphoric acid plants can be quite large, e.g. a plant producing 800,000 tons of $P_2O_5$/year as wet process phosphoric acid could generate about 30,000 tons per year of fluosilicic acid. The fluosilicic acid produced is considered an undesirable by-product, since there is typically little market for it and, additionally, the fluosilicic acid can cause atmospheric and stream pollution problems. The industry has long sought, with limited success, a worthwhile use for the fluosilicic acid.

One use that has been sought for fluosilicic acid is the production of high grade silica by reacting the fluosilicic acid with ammonia compounds. U.S. Pat. No. 3,271,107 is an example of a process producing silica via the ammonia-fluosilicic acid reaction. Another use sought for the fluosilicic acid is to utilize fluorine values contained in the fluosilicic acid to produce fluorine-containing products such as ammonium fluoride and metal fluorides. U.S. Pat. No. 4,026,997 is an example of a process producing ammonium fluoride from fluosilicic acid. U.S. Pat. No. 4,264,563 is an example of a process producing a metal fluoride from fluosilicic acid. It does not appear that processes producing either silica exclusively, or fluorine-containing products exclusively, from fluosilicic acid can be commercially successful at today's prices for these commodities. It appears that a process must recover both a silica product and a fluorine product or products to be economically successful. The processes described in U.S. Pat. Nos. 4,308,244 and 3,549,317 recover silica as well as metal fluorides from fluosilicic acid.

Despite the availability of the above processes for recovering silica and fluorine products, only small amounts of the fluosilicic acid available are being processed. Even though there has long been a need in the industry for an economical use for the fluosilicic acid, the presently available processes are obviously not economically effective, since so little fluosilicic acid is being processed. A major reason that has made some of the existing processes uneconomical is that the silica produced contained excessive impurities, rendering it unsuitable for most industrial applications.

Obviously a need exists for an economical process for producing high quality silica and fluorine products from fluosilicic acid.

Thus, an object of this invention is to provide an economical use for byproduct fluosilicic acid produced in wet process phosphoric acid plants. Another object of this invention is to provide a method of economically extracting valuable products from fluosilicic acid. Still another object of this invention is to produce high-grade silica and fluorine-containing products from fluosilicic acid. Yet another object of the invention is to produce, from fluosilicic acid, silica and fluorine-containing products with low levels of impurities.

The invented process described herein is directed toward accomplishing the above objects.

SUMMARY OF THE INVENTION

The invented process produces high grade silica and fluorine products from fluosilicic acid.

Silica is produced first. The fluosilicic acid, $H_2SiF_6$, and aqua ammonia, $NH_4OH$, are mixed and reacted under carefully controlled conditions until the reaction is complete. Hydrated silica particles formed in the reaction are filtered from the reaction solution and washed under controlled conditions. The silica particles are then dried and milled to the right product size.

In addition to silica, a dilute solution of $NH_4F$ is produced in the above fluosilicic acid-ammonia reaction. In the preferred mode of the invention, the $NH_4F$ is reacted with metal hydroxides or oxides to produce metal fluorides. The processes for producing two metal fluorides, i.e. sodium fluoride, $NaF$, and calcium fluoride are of most interest in the present invention and are described herein. Other metal fluorides and metal fluoride salts, e.g. lithium fluoride and potassium fluoride may also be produced by slight variations in the process.

To produce sodium fluoride, a portion of the $NH_4F$ solution is reacted with sodium hydroxide, $NaOH$. The $NaF$ is crystallized, filtered and dried and is available as the second product of the present invention.

To produce calcium fluoride, a portion of the $NH_4F$ solution is reacted with lime $(Ca(OH)_2)$. The $CaF_2$ precipitate is dried and is available as the third product of the present invention.

In addition to producing metal fluorides and metal fluoride salts from the dilute $NH_4F$ solution produced in the fluosilicic acid-ammonia reaction, the dilute $NH_4F$ solution may be concentrated and marketed as $NH_4F$.

DETAILED DESCRIPTION OF THE INVENTION

Figure 1:
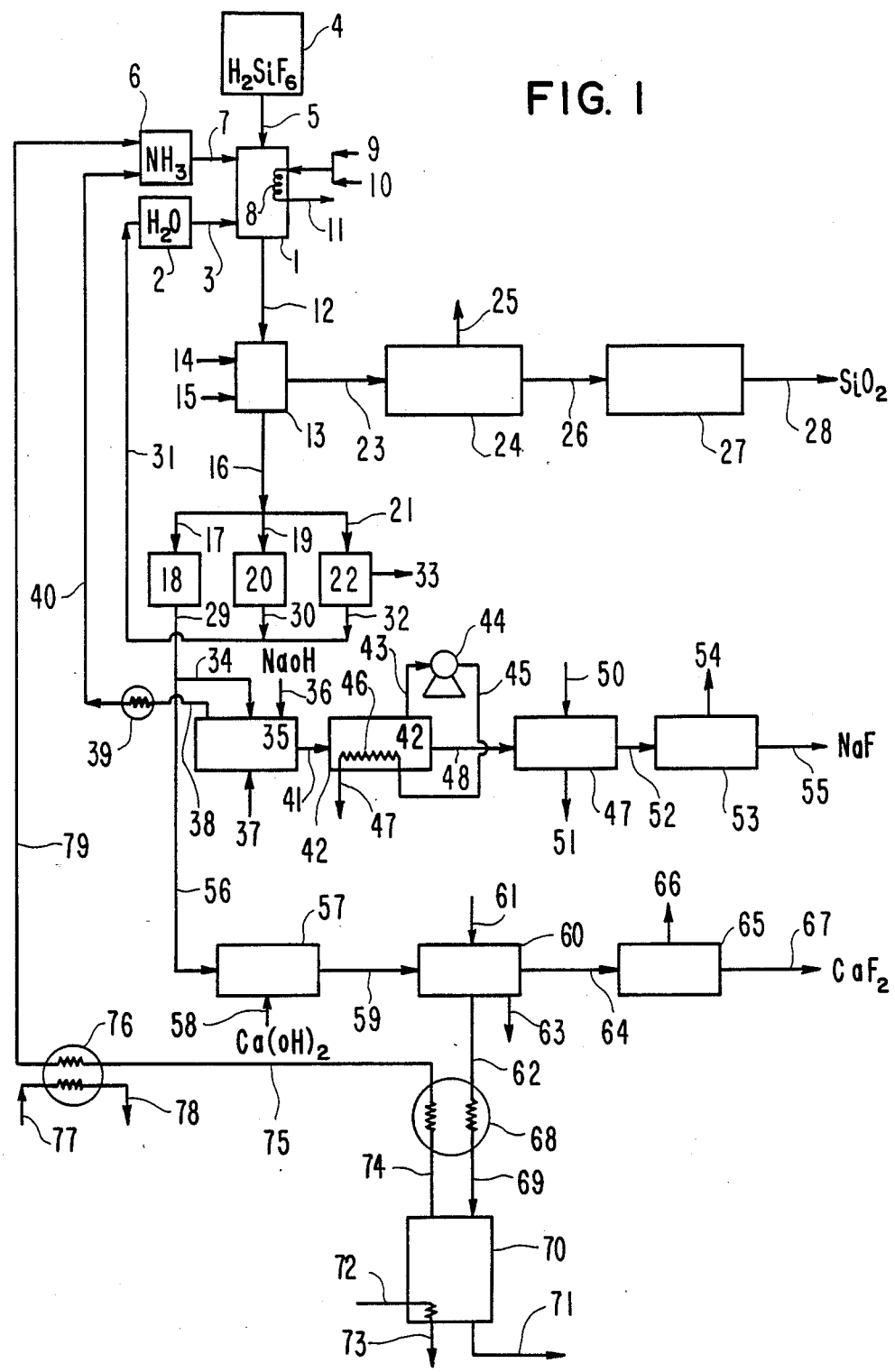
FIG. 1 is a Process Flowsheet of the preferred mode of the invention.

The present invention process of co-producing silica and fluorine products from fluosilicic acid is described below.

Silica is first produced batchwise by reacting fluosilicic acid with aqua ammonia solution. The reaction takes place as follows:

$$H_2SiF_6 + 6NH_4OH \rightarrow SiO_2\downarrow + 6NH_4F + 4H_2O \quad \text{(Reaction I)}$$

An important aspect of the present invention was the determination that the above hydrolysis reaction must be driven to completion. If Reaction I is not driven to completion, the solid silica in the slurries which result from Reaction I will contain appreciable quantities of fluorine as an impurity. Although the reasons are not fully understood, fluorine interferes with silica recovery by solids-liquids separation techniques such as filtration. Thus, Reaction I must be driven to completion or silica product yield and quality suffer. Two independent methods of driving the reaction to completion were discovered. Either of the two independent methods may be employed. Preferably, both methods are employed as a safeguard. The two methods are identified and discussed in the description of the process, following.

Referring to FIG. 1, to accomplish the above reaction, reactor 1 is first charged via line 3 with water from storage tank 2. This water is composed partly of water from tanks 20 and 22 and may contain small quantities of $NH_4F$. Next, a 20–30% by weight $H_2SiF_6$ solution from tank 4 and a 20–29% by weight aqueous $NH_3$ solution from tank 6 are simultaneously added via lines 5 and 7, respectively, to reactor 1. The weight of fluosilicic acid solution added is 0.1 to 2.0 times the weight of water charged to the reactor 1. The aqueous ammonia solution is added in an amount necessary to maintain the pH of the reactor solutions at between about 6 and 8. An equivalent amount of gaseous $NH_3$ may be added instead of aqueous ammonia. The rate of reactant addition is adjusted so that the time required for reactant addition is about 15 minutes. The temperatures of the reactor 1 is maintained at 100°–125° F. during reactant addition via heat exchanger 8 into which either cool water 9 or steam 10 may be introduced as needed. Reactor jacketing may alternately be used to control the reactor temperature. The addition of $H_2SiF_6$ is then stopped and aqueous $NH_3$ addition is continued until the pH of the reactor 1 solution reaches at least about 8.0. The most preferable pH range for the reactor solution is from 8.0 to 9.5. A slurry of hydrated silica particles suspended in the $NH_4F$ solution exists at this point in the reactor 1. Reactant addition is then stopped and the reactor slurry is then aged for about 15 minutes. Temperature control of the reactor slurry at this point constitutes one of the two aforementioned independent methods of driving Reaction I to completion. If the reactor slurry is maintained at a minimum temperature of 100° F. during the time that the solution is at a pH of at least 8.0, Reaction I will be driven to completion. The most preferred temperature range is 100°–125 F. since, above 125° F., ammonia loss becomes substantial.

The $H_2SiF_6$—$NH_4OH$ reaction is virtually complete at this time. The reactor slurry of hydrated silica particles suspended in an ammoniacal $NH_4F$ solution is next passed via line 12 to a filter 13. Centrifuges or other conventional solids-liquids separation equipment may be used instead of filters. The hydrated silica particles are retained on filter 13 and the $NH_4F$ solution passes through filter 13 via lines 16 and 17 to storage tank 18.

The hydrated silica particles retained on the filter medium of filter 13 are first washed in place with 100° F. deionized water 14 until the conductivity of the wash water effluent drops below 250 $\mu S/cm$ (microsiemans/centimeter). A second washing of the hydrated silica is now accomplished with a very dilute ammonia solution 15 having a pH of about 8.0 to 9.5. A total of about 2.5 gallons of ammonia solution 15 is used per pound of hydrated silica. This wash step using 8.0 to 9.5 pH ammonia solution constitutes the second of the two aforementioned independent methods of driving Reaction I to completion, and is preferred over water washing, alone. Additionally, we find acid washing, such as employed in the aforementioned process U.S. Pat. No. 4,308,244, unsatisfactory because of the undesirable waste streams formed. The temperature of the ammonia wash solution can be from ambient to boiling, however, completely satisfactory results have been obtained in a temperature range 60°–130 F. A third washing of the hydrated silica with 100° F. deionized water 14 is next carried out until the conductivity of the effluent drops below 100 $\mu S/cm$. The wash water used in the first wash is passed by lines 16 and 17 to tank 18. The wash water used in the second wash is passed by lines 16 and 19 to tank 20. The wash water used in the third wash is passed by lines 16 and 21 to tank 22.

Three alternate methods of washing the silica particles retained on the filter medium may be used. In the first alternate method, the first wash step using deionized water 14 that was described above is eliminated and the washing is accomplished in two steps with a first washing by a very dilute ammonia solution 15 having a pH of about 8.0 to 9.5, and a second washing with deionized water 14. Approximately 2.5 gallons of ammonia wash solution 15 is required per pound of hydrated silica retained on the filter medium of filter 13. The deionized water wash step is continued until the conductivity of the wash solution drops below 100 $\mu S/cm$. The ammoniacal wash water used would be passed by lines 16 and 21 to tank 22. Some of the wash water of tank 22 is recirculated by lines 32 and 31 back to storage tank 2. Some of the wash water of tank 22 is sent to waste 33. The exact proportion of wash water sent to waste is dependent on the concentration of undesirable impurities in the wash water.

In the second alternate method of washing the silica, a single wash step utilizing dilute ammonia solution 15 having a pH of about 8.0 to 9.5 is carried out until the conductivity of the wash solution drops below 250 $\mu S/cm$.

The third alternate method of washing the silica consists of using deionized water 14 alone. The wash step is carried out until the conductivity of the wash solution drops below 100 $\mu S/cm$. If this wash procedure is used, it is essential that the reactor 1 solution is held at a minimum temperature of 100° F. and a minimum pH of 8.0 to insure that Reaction I has been driven to completion. The decision as to which of the four methods of silica washing is to be used will depend on such factors as the concentration of impurities contained in the silica and on silica product quality requirements.

Clean process water may be substituted for deionized water in the wash steps, however, deionized water is preferred.

The washed silica is transferred from the filter medium of filter 13 through line 23 to silica dryer 24 which can be an industrial direct or indirect dryer which operates by mild heating. A temperature of at least 125° C. is maintained in dryer 24. Preferably, a dry silica product having a free moisture content of less than 20% is produced. Moisture released during the drying operation exits the dryer through line 25. The dry silica exits dryer 24 via line 26 and passes to mill 27 which can be a standard industrial mill, e.g. air impact or jet mill. In mill 27, agglomerated silica particles are broken up to decrease product silica particle size. Agglomerated silica particles entering the mill are in the size range of 10–100 microns but can be reduced by milling to a much smaller size, e.g. <1 micron. The silica product exits from mill 27 via line 28.

The solution contained in wash tank 18 is used to produce fluorine-containing products via the methods described below. The solutions contained in tanks 20 and 22 are dilute and extremely dilute, respectively, in terms of $NH_4F$ content. All the wash water of tank 20 is recirculated by lines 30 and 31 back to storage tank 2. Some of the wash water of tank 22 is recirculated via lines 32 and 31 back to storage tank 2. Some of the wash water of tank 22 is sent to waste 33. This facilitates the bleedoff of undesirable impurities and prevents these impurities from building up in the circuit.

The $NH_4F$ solution in tank 18 is reacted with metal oxides and/or hydroxides to produce metal fluorides. The process for producing two metal fluorides, i.e. NaF and $CaF_2$ is described below. Alternatively, the dilute $NH_4F$ solution of tank 18 may be concentrated by conventional means to at least 30% by weight $NH_4F$ and marketed as concentrated $NH_4F$.

To produce sodium fluoride and calcium fluoride, the $NH_4F$ solution from wash tank 18 is divided into two exit streams. One stream exits wash tank 18 by line 29 and enters reaction evaporator 35 via line 34. Steam 37 is introduced to evaporator 35 to maintain the temperature at about 212° F. Sodium hydroxide 36 is also added to reaction evaporator 35 and the following reaction between sodium hydroxide and ammonium fluoride takes place:

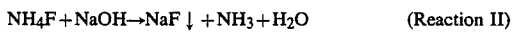

$$NH_4F + NaOH \rightarrow NaF\downarrow + NH_3 + H_2O \quad \text{(Reaction II)}$$

Ammonia and water vapor are released from the solution and pass from the reaction evaporator through line 38 to condenser 39. From condenser 39 the condensed aqueous ammonia is passed by line 40 to ammonia storage tank 6.

The sodium fluoride (NaF) produced in Reaction II begins to precipitate in the form of crystals in reaction evaporator 35. The hot NaF crystal-containing solution is next transferred by line 41 to crystallization evaporator 42 where the bulk of the NaF crystallization process takes place. The retention time of the solution in the two evaporators is adjusted periodically to assure that the bulk of the NaF crystallization takes place in the crystallization evaporator. Water vapor from the hot NaF solution exits crystallization evaporator through line 43 and passes to compressor 44 where it is compressed to about 5-15 pounds per sq. inch gauge and passed via line 45 to heat exchanger 46 located in crystallization evaporator 42 and finally to waste via line 47. The NaF slurry contained in crystallization evaporator 42 is next transferred via line 48 to filter 49. The NaF crystals are retained on the filter medium of filter 49. The NaF mother liquor passes from the filter 49 through line 51. The NaF crystals retained on the filter medium are washed with water 50 and the wash water effluent passes from the filter 49 through line 51. The NaF crystals are next passed via line 52 to dryer 53 which is mildly heated by either direct means or indirect means. Water vapor released from the dryer 53 leaves the dryer 53 through line 54. The dry product, NaF, leaves the dryer 53 via line 55.

The third product of this invention, synthetic fluorspar ($CaF_2$), is produced from the reaction of a portion of the $NH_4F$ solution contained in tank 18 with lime ($Ca(OH)_2$). The $NH_4F$ solution is transferred from tank 18 via lines 29 and 56 to $CaF_2$ reactor 57. Lime ($Ca(OH)_2$) is injected into reactor 57 by line 58 and the following reaction occurs:

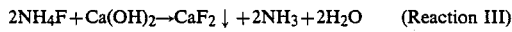

$$2NH_4F + Ca(OH)_2 \rightarrow CaF_2\downarrow + 2NH_3 + 2H_2O \quad \text{(Reaction III)}$$

A precipitate of $CaF_2$ forms rapidly in reactor 57. The $CaF_2$ precipitate-containing slurry is transferred from reactor 57 via line 59 through filter 60, where the solid $CaF_2$ is retained on the filter medium of filter 60 while the mother liquor exits the filter through line 62. The $CaF_2$ retained on the filter medium is washed with water 61 and the wash water effluent exits the filter via line 63 and passes to waste. The solid $CaF_2$ collected on the filter medium of filter 60 is next passed via line 64 to $CaF_2$ dryer 65, which can be any suitable industrial direct or indirect dryer. Water vapor released in the drying operation leaves the $CaF_2$ dryer 65 through line 66. Solid, dry $CaF_2$ product exits dryer 65 via line 67.

The mother liquor in filter 60 contains significant amounts of $NH_3$ as a result of Reaction III in $CaF_2$ reactor 57 which generates $NH_3$. The mother liquor from filter 60 is transferred by line 62 to condenser 68 where it is heated by indirect contact with hot $NH_3$ gas coming from ammonia stripper 70. The mother liquor exits condenser 68 through line 69 and passes to ammonia stripper 70 which is heated by indirect or direct contact with steam entering the stripper through line 72. If heating is indirect, steam exits through line 73. The mother liquor in stripper 70 is heated to boiling temperature, which ranges from 180°-212° F. At this temperature $NH_3$ and $H_2O$ are boiled from the mother liquor and the hot gas stream exits the stripper, through line 74. The stripped mother liquor is transferred through line 71 to waste. The hot $NH_3$ and $H_2O$ gases leave ammonia stripper 70 through line 74 and pass through condenser 68 where they are cooled and partially condensed by indirect contact with mother liquor passing from filter 60 via lines 62 and 69 through condenser 68 to ammonia stripper 70. The $NH_3 + H_2O$ stream leaves condenser 68 by line 75 and is passed through condenser 76 to complete condensation by indirect contact with water stream 77. Heated water exits the condenser through line 78. The $NH_3 + H_2O$ condensate exits the condenser by line 79 and is passed to tank 6.

The above description and related flowsheet have been simplified for clarity. Many other pieces of equipment and pipelines would be used in an actual industrial plant.

The described invention avoids the high level of impurities in the silica product that has plagued other processes attempting to produce silica from fluosilicic acid. For example, silica produced contains not only extremely low levels of sodium and sulfate, but also very low levels of fluorine. This, in turn, results in the silica having superior electrical properties. The above invention produces silica with a high surface area, i.e. 120-180 $m^2/gm$ (BET nitrogen adsorption, industry standard measuring method). This high surface area enhances the silica's value. For example, silica with high surface area is well suited for such upper end uses as in silicon rubber compounding. Although the exact reasons for the low level of impurities and high surface area of the silica product are not completely understood, it is obvious that the inventors' discovery of the necessity to drive Reaction I to completion and their ensuing discovery of the two previously discussed techniques for doing this play a key role.

The inventors' method of washing freshly produced silica with an ammonia solution of pH 8.0 to 9.5 while the silica is retained on the silica filter (13) medium is a particularly important and novel element in reducing the impurity level of the product silica. Even though the wash step using ammonia is particularly novel and is used in the present invention, it should be again stated that the ammonia wash step and the described temperature control conditions in the reactor each, independently, can achieve the very important object of driving Reaction I to completion. As a safeguard, the preferred method of practicing the invention employs both techniques.

The use of deionized water for dilution and wash purposes is also a factor in keeping the impurity level low. The discovery of the importance of monitoring the conductivity of silica filter washwater effluent and continuing the washing operation until the conductivity of said wash water effluent drops below 100 $\mu S/cm$ has also been a factor in the success of the process. The controlled rate of addition of $H_2SiF_6$ and aqua $NH_3$, and the time of aging of the silica-containing slurry are also regarded as factors in making the process work in an economical manner.

Although most of the novel features of the invented process are in the silica-producing portion of the process, certain of the inventors' techniques, when applied to the metal fluoride-producing part of the process, make the overall process more efficient. One of these techniques is in the control of the rate at which the reactants pass through the reaction and crystallization evaporators of the NaF-producing circuit of the process. The reactant flow rate is timed to assure that the solutions and slurries contained in reaction evaporator (35) are transferred to crystallization evaporator (42) at the time that crystallization of NaF is just beginning. The inventors discovered that transferring the solutions and slurries too soon results in reduced $NH_3$ recovery. Delayed transfer of the solutions and slurries results in excessive product impurities.

To sum up, the inventors' process simultaneously produces high quality silica and fluorine-containing products in an economic process. To accomplish this, the inventor's have combined known techniques with their own newly discovered techniques.

The following examples will illustrate the invented process.

EXAMPLE 1

In Example 1 and the other examples, electrically driven micropumps were used to add the fluosilicic acid, aqua ammonia and deionized water. Reactor and wash solution pHs were monitored and recorded using a Model 125 Corning pH meter and electrode and a Series D5000 Omniscribe recorder. A Sharples, Type 14×6 Mark 3 centrifuge equipped with a centrifuge bag was used to separate the silica from the reactor slurry.

A test vessel of approximately 10 gallon capacity was used as the reactor. The reactor was first charged with 22.5 liters of 100° F. deionized water. Simultaneous addition of 25% $H_2SiF_6$ and 29% aqua ammonia was then begun. Over the 15 minute addition time, 5480 ml. of the 25% $H_2SiF_6$ solution and sufficient aqua ammonia were added to hold the pH of the reactor solution in the range of 7.0-7.3. Approximately, 4000 ml. of the aqua ammonia solution was required. The reactor solution temperature was maintained at 100° F. during the 15 minute chemical addition time. After addition of the 5480 ml. of 25% $H_2SiF_6$ was completed, the addition of aqua ammonia was continued until the reactor solution pH reached 9.3. This pH adjustment required the addition of approximately 4,200 ml. of aqua ammonia solution. The reactor slurry was then aged at 100° F. for 15 minutes. The reactor slurry, which contained solid silica precipitate from the fluosilicic acid-aqua ammonia reaction, was then transferred to the centrifuge operating at about 400 rpm. The centrifuging action separated the $NH_4F$-containing solution from the silica precipitate. The silica was retained on the centrifuge bag, where it was washed in three stages. The first washing was with 130° F. deionized water and this washing was continued until the wash water filtrate conductivity dropped below 250 $\mu S/cm$. The second washing was with 9.3 pH ammonia solution at 130° F. Approximately 15,000 ml. of the ammonia solution was used in the washing. The third washing was with 130° F. deionized water and was continued until the wash water effluent conductivity dropped below 100 $\mu S/cm$. The centrifuge was then brought up to 1500 rpm to remove most excess water from the silica. The silica was then dried in a laboratory oven at 125° C. for 16 hours. The final silica product was then collected. No metal fluorides were produced in this example. The results of the test are shown in Table I.

EXAMPLE 2

The test procedure of Example 1 was then repeated with the three step silica wash procedure replaced with a single washing by deionized water at 130° F. Washing of the silica was continued until the conductivity of the wash water effluent dropped below 100 $\mu S$. All other test conditions were held constant. The results of this test are also shown in Table 1.

Referring to Table 1, both Example 1 and Example 2 produced silicas of usable quality. The surface area of the silica produced with the three step wash (Example 1) was substantially higher, however, than the silica produced with the one step wash (Example 2).

This example illustrates the importance of the wash procedure and how the quality of silica produced can be affected by changes in the wash procedure. It also shows that silica of usable quality can be produced without the ammonia wash step. In such cases, the reactant solution must be held at a minimum temperature of 100° F. and a minimum pH of 8.0 to allow Reaction I to go to completion.

EXAMPLE 3

Two changes were made in the test procedure. First, a one-step wash procedure using 9.3 pH ammonia solution was used. Second, the wash temperature was changed from 130° F. to 100° F. The test results are shown in Table 1, below. As in Example 1, this procedure produced an excellent quality silica product.

TABLE 1

SILICA PRODUCTION RUNS WITH THREE-STEP AND ONE-STEP WASHING PROCEDURES

| Run | $SiO_2$ Yield (%) | Surface Area BET $M^2/g$ | Bulk Density lb./ft$^3$ | % F |
|---|---|---|---|---|
| Example 1 (three-step wash) | >90 | 154 | 20.1 | <0.03 |
| Example 2 | | | | |

TABLE 1-continued
SILICA PRODUCTION RUNS WITH THREE-STEP AND ONE-STEP WASHING PROCEDURES

| Run | $SiO_2$ Yield (%) | Surface Area BET $M^2/g$ | Bulk Density lb./ft$^3$ | % F |
|---|---|---|---|---|
| (one-step deionized water wash) | >90 | 119 | 21.5 | <0.03 |
| Example 3 (one-step dilute Ammonia wash) | >90 | 179 | 17.8 | <0.03 |

EXAMPLE 4

Example 4 is performed by the same procedure as Example 3 with the exception that the aging step is deleted. The slurry of solid silica and ammonium fluoride solution formed in the reactor is immediately transferred to a centrifuge (or filter) and washed with an aqueous ammonia solution having a pH of between 8.0 and 9.5. The ammonia wash step insures that Reaction I is driven to completion and a silica product of usable quality results.

EXAMPLE 5

Example 5 is performed by the same procedure as Example 4 with the exception that the ammonia wash step is deleted and replaced by a single wash with deionized water alone. Thus, neither of the independent techniques of driving Reaction I to completion is accomplished. Silica yield is less than 70% and the surface area of the silica produced in less than 120 $M^2/g$. The silica produced can be sold for certain use but, because of the relatively poor yield, the commercial feasibility of producing the silica is doubtful.

We claim:

1. A process for producing a silica product and a liquid phase containing an ammonium fluoride product, comprising:
   (a) adding a material consisting of water, to a reactor;
   (b) simultaneously adding fluosilicic acid and a composition selected from the group consisting of ammonia and an aqueous solution of ammonia, to said water in an amount sufficient to provide between 0.1 and 2.0 pounds of fluosilicic acid solution per pound of water originally contained in the reactor, and to maintain the pH of the liquid phase of the resultant slurry of silica and ammonium fluoride solution at between 6 and 8;
   (c) thereafter, discontinuing the addition of fluosilicic acid but continuing the ammonia addition until said pH in said liquid phase increases to at least about 8.0;
   (d) aging the thus treated slurry of silica and ammonium fluoride solution at a temperature exceeding about 100° F.;
   (e) separating said aged slurry into a solid phase containing said silica and a liquid phase containing said ammonium fluoride product; and
   (f) washing said separated silica-containing solid phase to recover therefrom said silica product, said silica being precipitated particles substantially free of impurities and having a size of about 10 to 100 microns and a surface area of about 120 to 180 m$^2$/gm.

2. The process of claim 1 wherein the addition of fluosilicic acid is discontinued but ammonia addition is continued until said pH in said liquid slurry increases to between 8.0 and 9.5.

3. The process of claim 1 wherein the fluosilicic acid added to said reactor is 20–30% by weight fluosilicic acid.

4. The process of claim 1 wherein the aqueous solution of ammonia added to said reactor is 20 to 29% by weight ammonia.

5. The process of claim 1 wherein the retention time of said aging step is at least 15 minutes.

6. The process of claim 1 wherein said separated silica-containing solid phase is washed with an aqueous ammonia solution having a pH between about 8.0 to 9.5.

7. The process of claim 6, further comprising washing the washed silica-containing solid phase with water at a temperature exceeding about 100° F.

8. The process of claim 1, wherein said washing step is effected by:
   (a) washing said separated silica-containing solid phase with water at a temperature exceeding about 100° F.;
   (b) further washing said separated silica-containing solid phase with an aqueous ammonia solution having a pH between about 8.0 and 9.5; and
   (c) thereafter, washing said further washed, separated silica-containing solid phase with water at a temperature exceeding about 100° F.

9. The process of claim 1, 7, or 8 wherein said water added to reactor and said wash water is deionized water.

10. The process of claim 1, further comprising concentrating said separated liquid phase containing said ammonium fluoride product to produce a concentrated ammonium fluoride solution containing at least 30% by weight NH$_4$F.

11. The process of claim 1, further comprising drying said silica product at a temperature above about 125° C. to produce a dry silica having a free moisture content between 0 and 20%.

12. The process of claim 11, further comprising milling said dry silica to produce a fine particle size dry silica having a particle size below 10 microns.

13. A process for producing a silica product and a liquid phase containing a metal fluoride product, comprising:
   (a) adding a material consisting of water, to a reactor;
   (b) simultaneously adding fluosilicic acid and a composition selected from the group consisting of ammonia and an aqueous solution of ammonia, to said water in an amount sufficient to provide between 0.1 and 2.0 pounds of fluosilicic acid solution per pound of water originally contained in the reactor, and to maintain the pH of the liquid phase of the resultant slurry of silica and ammonium fluoride at between 6 and 8;

(c) thereafter, discontinuing the addition of fluosilicic acid but containing the ammonia addition until said pH in said liquid phase increases to at least about 8.0;

(d) aging the thus treated slurry of silica and ammonium fluoride solution at a temperature exceeding about 100° F.;

(e) separating said aged slurry into a solid phase containing said silica and a liquid phase containing said ammonium fluoride;

(f) washing solid separated silica-containing solid phase to recover therefrom said silica product, said silica being precipitated particles substantially free of impurities and having a size range of 10 to 100 microns and a surface area of about 120 to 180 m²/g;

(g) reacting said separated liquid phase containing said ammonium fluoride with a compound selected from the group consisting of the oxides and hydroxides of calcium, sodium, lithium and potassium, to form a slurry of said metal fluoride product and a liquid phase effluent; and (h) separating said metal fluoride product from said liquid phase effluent.

14. The process of claim 13 wherein the addition of fluosilicic acid is discontinued but ammonia addition is continued until said pH in said liquid slurry increases to between 8.0 and 9.5

15. The process of claim 13 wherein the fluosilicic acid added to said reactor is 20 to 30% by weight fluosilicic acid.

16. The process of claim 13 wherein the aqueous solution of ammonia added to said reactor is 20 to 29% by weight ammonia.

17. The process of claim 13 wherein said aging step is at least 15 minutes.

18. The process of claim 13 wherein said separated silica containing solid phase is washed with an aqueous ammonia solution having a pH between about 8.0 and 9.5.

19. The process of claim 18, further comprising washing the washed silica-containing solid phase with water at a temperature exceeding about 100° F.

20. The process of claim 13, wherein said washing step is effected by:

(a) washing said separated silica-containing solid phase with water at a temperature exceeding about 100° F.;

(b) further washing said separated silica-containing solid phase with an aqueous ammonia solution having a pH between about 8.0 and 9.5 and (c) thereafter, washing said further washed, separated silica-containing solid phase with water at a temperature exceeding about 100° F.

21. The process of claim 13, further comprising drying said silica product at a temperature of about 125° C. to produce a dry silica having a free moisture content between 0 and 20%.

22. The process of claim 21, further comprising milling said dry silica to produce a fine particle size dry silica having a particle size below 10 microns.

23. The process of claim 1 wherein the washing of said silica-containing solid phase is conducted using water with the reaction liquid phase being held at a minimum pH of 8 and a minimum temperature of 100° F.

24. The process of claim 13 wherein the washing of said silica-containing solid phase is conducted using water with the reaction liquid phase being held at a minimum pH of 8 and a minimum temperature of 100° F.

25. A process for producing a silica product and a liquid phase containing an ammonium fluoride product, comprising:

(a) adding a material consisting of water, to a reactor;

(b) simultaneously adding fluosilicic acid and a composition selected from the group consisting of ammonia and an aqueous solution of ammonia, to said water in an amount sufficient to provide between 0.1 and 2.0 pounds of fluosilicic acid solution per pound of water originally contained in the reactor, and to maintain the pH of the liquid phase of the resultant slurry of silica and ammonium fluoride solution at between 6 and 8;

(c) thereafter, discontinuing the addition of fluosilicic acid but continuing the ammonia addition until said pH in said liquid phase increases to at least about 8.0;

(d) separating said slurry into a solid phase containing said silica and a liquid phase containing said ammonium fluoride product; and (e) washing said separated silica-containing solid phase to recover therefrom said silica product, said silica being precipitated particles substantially free of impurities and having a size of about 10 to 100 microns and a surface area of about 120 to 180 m²/gm.

26. A process for producing a silica product and a liquid phase containing a metal fluoride product, comprising:

(a) adding a material consisting of water, to a reactor;

(b) simultaneously adding fluosilicic acid and a composition selected from the group consisting of ammonia, to said water in an amount sufficient to provide between 0.1 and 2.0 pounds of fluosilicic acid solution per pound of water originally contained in the reactor, and to maintain the pH of the liquid phase of the resultant slurry of silica and ammonium fluoride at between 6 and 8;

(c) thereafter, discontinuing the addition of fluosilicic acid but containing the ammonia addition until said pH in said liquid phase increases to at least about 8.0;

(d) separating said slurry into a solid phase containing said silica and a liquid phase containing said ammonium fluoride;

(e) washing said separated silica-containing solid phase to recover therefrom said silica product, said silica being precipitated particles substantially free of impurities and having a size range of 10 to 100 microns and a surface area of about 120 to 180 m²/g;

(f) reacting said separated liquid phase containing said ammonium fluoride with a compound selected from the group consisting of the oxides and hydroxides of calcium, sodium, lithium and potassium, to form a slurry of said metal fluoride product and a liquid phase effluent; and (g) separating said metal fluoride product from said liquid phase effluent.

* * * * *